United States Patent [19]

Tan

[11] Patent Number: 4,507,778
[45] Date of Patent: Mar. 26, 1985

[54] DIGITAL TRANSMISSION SYSTEM
[75] Inventor: Yoichi Tan, Kanagawa, Japan
[73] Assignee: Fuji Xerox Co., Ltd., Tokyo, Japan
[21] Appl. No.: 437,717
[22] Filed: Oct. 29, 1982
[30] Foreign Application Priority Data Oct. 30, 1981 [JP] Japan ................ 56-172896

[51] Int. Cl.³ .............................. H04J 3/00
[52] U.S. Cl. ................................... 370/94
[58] Field of Search .......... 370/60, 94, 89, 93
[56] References Cited

U.S. PATENT DOCUMENTS 4,168,400 9/1979 de Couasnon et al. ........... 370/94
4,251,880 2/1981 Baugh et al. ..................... 370/94
4,287,592 9/1981 Paulish et al. .................... 370/94

Primary Examiner—Douglas W. Olms
Assistant Examiner—Frank M. Scutch, III
Attorney, Agent, or Firm—Sughrue, Mion, Zinn, Macpeak and Seas

[57] ABSTRACT

In a multi station communication network wherein interstation communications are carried out by transmitting packets of information in selected blocks of repeating time division multiplex frames, the calling station reserves a block for transmission of an answer packet from the called station.

10 Claims, 2 Drawing Figures

DIGITAL TRANSMISSION SYSTEM

BACKGROUND OF THE INVENTION

The present invention relates to a digital signal transmission system for effecting data transmission in a packet form, and more particularly to a digital signal transmission system in which the packet transmission by a called station is facilitated.

As the use of computers has spread and as digital signal processing techniques have progressed, a data comunication technique has moved into the limelight in which a communication system and a data processing system are combined so as to enable information to be processed by on-line processing. As a small-scale communication system, such as a private communication system installed in the precincts of government and public agencies, companies, or the like, such a communication system in a packet form using a communication cable, e.g. a coaxial cable, attracts public attention due to its low cost, high reliability and high transmission efficiency.

In such a packet-form communication system, a number of personal stations are connected to a communication cable for effecting bi-directional transmission to and from a computer disposed in a laboratory or the like so that messages each divided into data blocks of 1,000 to 2,000 bits may be transmitted from each station. Each message is additionally provided with a header containing its designation, running number or the like. In this communication system, control functions are completely distributed to the respective stations and therefore the network per se is a mere passive transmitting medium having no control function. Accordingly, each station begins transmitting a message after it confirms that the transmission line is available. When interference with a packet from another station occurs during the transmitting operation, both the concerned stations stop their transmitting operations. Each of the stations which has stopped its transmitting operation will then try to transmit the message again after a random queuing time.

In such a communication system, any user at any station not only can access one and the same computer but also can utilize any hardware such as a memory or any software such as a program among the hardware and software distributed amongst the plurality of stations. That is, in this communication system, devices such as high speed or high accuracy printers, large scale files, or the like, which have been concentrated at the location of a large central computer in a time sharing system, may be utilized substantially equally by all stations. Thus, it becomes possible not only to economize resources and to improve practical efficiencies but also to develop a large-scaled software system due to the accommodation of programs and data. Further, in such a communication system, there is no priority in using the transmission line among the users or personal stations. Accordingly, there is no master and slave relationship which is often provided in other systems, so that communication may be carried on between any among the connected stations. Further, since the transmission line such as a coaxial cable is constituted by a complete passive circuit, a highly reliable system may be easily provided.

While this communication system has various advantages, but there is a possibility in this system that packets will interfere with each other on the same transmission line since each station may begin transmitting data at any time. Such interference between packets will become significant as the operating efficiency of the transmission line becomes higher.

To solve such a problem, there have been proposed a number of signal transmission systems such as the so-called "Priority Ethernet" and "Reservation Ethernet" Systems. In the former system, the priority of signal transmission of each station is indicated in the preamble portion of the packet so that, in case interference occurs between packets from different stations, one of the packets having higher priority is allowed to be transmitted preferentially. In the latter system, a master station which indicates the operation mode is always set so as to confirm whether each of the other, personal stations has a signal in a reserved mode waiting to be transmitted and the amount of information to be transmitted. As a result, the master station determines in every frame the order of packets to be transmitted by the respective stations so as to allow signals to be transmitted in time division multiplex in the transmitting operation mode.

In the former proposed signal transmission system, however, there is still a problem of variations in signal transmission delay time due to interference among packets having the same priority. Accordingly, this system is not suitable for real time transmission, such as conversational sound communication, in which importance is attached to the real time correspondency between transmitting and receiving operations.

In the latter signal transmission system, however, the above-mentioned inter-station equality is lost because of the existence of the master station. That is, in this system, data communication must be stopped if any failure occurs in the master station, and in this sense the system reliability suffers.

In order to solve this problem, there has been proposed a digital signal transmission system in which real time transmission can be effected without losing the equality among personal stations. In this system, a frame which is cyclically repeated along the time axis is subdivided on the same time axis into a plurality of blocks so that each personal station may be given an opportunity for packet communication within the block. Thus, each station not only may have an equal opportunity to use an empty block but can also effect real time transmission because an opportunity for signal transmission is given periodically in every frame if the station occupies a certain block for a long enough period of time for the signal transmission.

FIG. 1 shows the frame configuration used in the system as mentioned directly above. A frame cyclically repeated on the time axis is constituted by N blocks #1 to #N. Each block is constituted by various bit strings $b_1$ to $b_9$ as follows:

$b_1$: backward guard time;
$b_2$: preamble;
$b_3$: start flag;
$b_4$: address bit string;
$b_5$: control bit string;
$b_6$: information bit string;
$b_7$: check bit string;
$b_8$: end flag; and
$b_9$: forward guard time.

The bit strings $b_2$ to $b_5$ and $b_7$ to $b_8$ are necessary to constitute a packet and are generally referred to as overhead or additional bits. Intervals $b_1$ and $b_9$ are generally referred to as guard time. That is, the guard time is an empty bit string for avoiding the situation that adjacent packets overlap with each other due to the delay time which may occur when the packets of each block propagate on the coaxial cable. The backward guard time $b_1$ is for protecting the rear packet from such an overlap situation, while the forward guard time $b_9$ is for protecting the forward packet in the same manner. The number of total bits of the backward guard time $b_1$ and the forward guard time $b_9$ is represented by g and the guard time ($b_1 + b_2$) is represented by $\tau_g$.

In this proposed digital signal transmission system, if no station is sending signals, any station can begin to send out such a frame configuration signal as described above at any time. A station which has first begun to send out a signal onto the communication cable takes the initiative of frame synchronization.

Once the frame synchronization has been established in this manner, all stations can monitor the status of signals transmitted on the communication cable. The user equipment at each station is provided with a memory for indicating the occupation status of the respective blocks in every frame so that the respective blocks are registered in accordance with the received packet signal of each station. When another station sends out a packet signal after the frame synchronization has been established, the station first searches for an empty block in accordance with the contents of the memory, occupies the block to prevent other stations from transmitting in that block, and times its own with the thus occupied block.

The search for empty blocks is effected in the frame immediately preceding the commencement of the packet transmission operation. In this case, the station has to confirm the fact that there are enough blocks available to accommodate the packet to be transmitted. The station must then particularly specify the blocks, and then transmit the packet. However, since any station has an equal opportunity to select any blocks in any frame, there are some cases where a packet transmitted from one station interferes with another packet transmitted from another station. Upon the occurrence of such interference between two packets, each of the concerned stations stops its packet transmission and then, after a lapse of a random time period, tries to retransmit its packet through blocks which are empty at that time. This procedure for transmitting a packet is the same without regard to whether it is by a calling station or a called station.

Interference among packets may rarely occur when the communication volume is low, and even when interference occurs the concerned station or stations will have an early opportunity to occupy other empty blocks. As the amount of communication increases, however, the possibility of packet interference increases, with a consequent increase in the time which elapses before the concerned station, whether it is a calling station or called station, succeeds in transmitting the packet. This increased period of time is quite wasteful and results in a decreased efficiency in the use of the communication cable. Particularly, when a station transmits a large amount of information, such as in the case of picture signal transmission, this station, i.e., the calling station, calls a called station by occupying a number of blocks. In this case, since the number of empty blocks in one frame is significantly decreased, the wasted time which elapses before the called station can occupy empty blocks for its response may be quite long. Further, this proposed system is arranged such that all stations can simultaneously receive one and the same packet and may thus realize a communication system between one station and plural stations (hereinafter referred to as broadcast communication system). In this case, however, a plurality of called stations may simultaneously search for empty blocks for their answer packets, and therefore the possibility of packet interference becomes very high. This results in a problem of extraordinarily lengthened channel connection time required before the initiation of data transfer.

SUMMARY OF THE INVENTION

The present invention is intended to eliminate the above-mentioned disadvantages, and an object of the invention is to provide a digital signal transmission system in which a called station may easily send its answer packet.

To attain the above-mentioned object, according to the present invention, a calling station previously designates a time slot for a called station to send its answer packet, with stations other than the called station being inhibited from using the designated time slot. In the preferred embodiment, this is accomplished by monitoring the designated answer block and, if an answer does not immediately appear, inserting a dead pulse into the answer block to prevent other stations from using it until the called station transmits its answer packet.

BRIEF DESCRIPTION OF THE DRAWINGS

A preferred embodiment of the present invention will be described in detail with respect to the accompanying drawings, in which.

DETAILED DESCRIPTION OF THE PREFERRED EMBODIMENT

Figure 2:
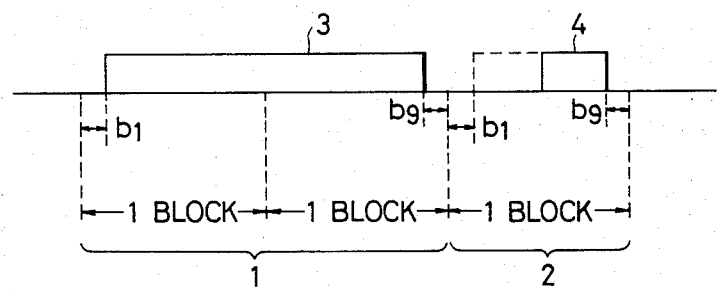
FIG. 2 shows an example of signal envelope waveform transmitted from a calling station in an embodiment of the present invention.

FIG. 2 shows, by way of example, a signal envelope waveform sent out from the transmitter side, or calling station, under the following conditions:

(1) The calling station requires two blocks to transmit information to a called station with one block being sufficient for the called station to transmit its answer to the calling station;

(2) The calling station has located three empty blocks prior to the initiation of packet transmission. In the illustrated case, three successive empty blocks have been located. The three empty blocks are required for the novel technique of the present invention whereby the calling station occupies not only two empty blocks generally designated by reference numeral 1 for packet transmission from the calling station but a further empty block designated by reference numeral 2 for answer packet transmission from the called station;

(3) The calling station is able to occupy the three blocks. To immediately occupy three blocks found in the frame immediately preceding the initiation of signal transmission, the calling station must avoid packet interference with respect to other stations. Of course, if this is a system where priority is assigned to the respective packets, the calling station may be able to occupy the three blocks even though packet interference occurs if the other stations are inferior in priority to the calling station. In other cases, the calling station may have a repeatedly attempt its signal transmission in order to obtain occupation of all three blocks.

The features by which the calling station ensures three blocks are as follows:

(i) The calling packet 3 is transmitted through the blocks 1. In this case, since two blocks are occupied for the packet 3 by the calling station, it is necessary to place backward guard time $b_1$ and forward guard time $b_9$ at the respective opposite ends of these blocks;

(ii) The calling station monitors the answering block 2 and, when no answer signal is received through the block 2 from the called station during the same frame, the calling station inserts a dead pulse 4 into the rear portion of the block 2. The forward guard time $b_9$ is of course placed at the end portion following the dead pulse 4. The purpose of inserting the dead pulse 4 is to confirm whether or not any signal exists.

Thus, FIG. 2 illustrates the signal envelope waveform in the case where the called station for some reason does not immediately transmit an answer signal in response to the transmission of calling packet 3. In this case, the calling station inserts a dead pulse 4 into the answer packet block 2 so as to inform other stations of the occupation of the block 2 to thereby inhibit stations other than the called station from using the block 2 in subsequent frames. Accordingly, if the called station has immediately sent an answer in the first frame, the calling station does not transmit the dead pulse 4. In this case, the right to use the answering block 2 is turned over to the called station. That is, the called station may transmit its answer packet without going through the normal process which the calling station undergoes to locate an available block.

Next, several particular situations will be considered which may arise in a communication system to which this digital signal transmission system is applied.

First, a situation may arise where some station other than the called station transmits a packet through the answer packet block 2 before the calling station has inserted the dead pulse 4 into the block 2. In the frame within which the calling station has transmitted the calling packet 3, the answer packet block 2 is merely an unoccupied block until the calling station inserts the dead pulse 4 into the answer packet block 2. Accordingly, it is to be expected that the above-mentioned situation will occur. In this case, the calling station inserts the dead pulse 4 into the rear portion of the answer packet block 2 as described above. By this dead pulse 4, each station may detect the occurrence of packet interference in the block which has been prepared as the answer packet block 2. In this case, if priority is given to the calling station which has inserted the dead pulse 4, the calling station may ensure the availability of this block in the subsequent frames. Alternatively, if priority is not set, the calling station may try again to transmit the calling packet by going through the regular processes.

Second, a different situation may arise where the called station transmits through the selected answer packet block 2 a packet with a purpose other than answering the call. In this case, the calling station may determine whether any interference has occurred or not by checking the information transmitted from the called station as to whether or not it is an answer to the command of the calling station. If it is not an answer to the calling station, it is treated as an interference in the answer packet block 2 in the same manner as described above.

However, in the communication system to which the above-mentioned method is applied, this second situation may be avoided to some degree. This is attained by an agreement that each station withholds the transmission of a new packet in the next frame following a frame in which a packet is newly transmitted, or that (ii) each station withholds the use of one or more blocks immediately after a newly transmitted packet.

Figure 1:
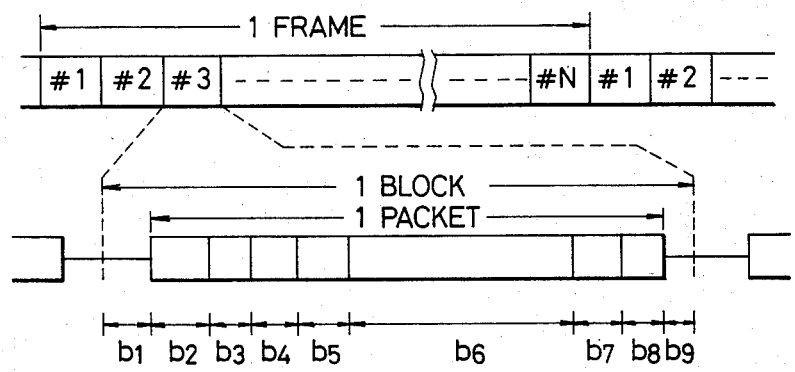
FIG. 1 shows by way of example the configuration of a signal employed in a digital signal transmission system wherein each of the frames periodically repeated on the time axis is subdivided into a plurality of blocks so that signals are transmitted by the block.

A third situation may occur wherein the called station occupies two or more blocks and where the answer packet block 2 does not immediately succeed the calling packet blocks 1. If the called station occupies two or more blocks, the calling station can insert the dead pulse 4 into each of a number of blocks necessary for the answer. If the amount of information to be transmitted from the called station is not definite, it will suffice to reserve a number of blocks corresponding to an estimated maximum amount of information. In this case, although the answer packet blocks 2 sometimes may not succeed each other, the individual answer packet block numbers may be allotted in the calling station information bit string $b_6$ (FIG. 1). This individual block number allotment is very advantageous in the case, to be described later, where block numbers are allotted to a plurality of called stations and the calling station is a central station having a host computer for data processing. In this case, various functions are concentrated at the calling station so as to attain efficient data processing between the calling station and one or more called stations which are only provided with terminal equipment.

A further situation which may arise is that digital information of the same content may be transferred from one calling station to a plurality of stations. In this case, the calling station uses the dead pulse 4 to reserve the same number of answer blocks as the number of called stations until answer signals have been sent back through all of the answer blocks. In this situation, the calling station must indicate which of the answer blocks corresponds to the respective called stations. This block assignment information is included in the calling packet so as to be transmitted therewith. In particular, for example, the destination codes of the respective called stations are sequentially aligned in the calling packet information bit $b_6$ so as to effect the block assignment. Then, the respective called stations use the answer packet blocks 2 in the order of the sequentially aligned destination codes. Alternatively, the calling station may assign one frame to each of the calling stations so as to assign the answer blocks.

Finally, in a communication system employing a broadcast transmission and having a low volume of information traffic from each of the called stations in the broadcast communication as mentioned above, efficient system operation may be attained by reserving only one block in each frame for all of the called stations. The calling station reserves only one block as the answer packet block 2 in each of the succeeding frames, and the right of use of the reserved block in each successive frame is given one by one to the respective called stations in the order designated by the calling packet. For example, the dialed-in destination numbers may be inserted one by one in the input order into one portion of the calling packet 3 in each of a plurality of successive frames. Each of the called stations may transmit an answer signal to the calling station by using the answer packet block 2, but only when its own destination number is sent out. Upon the completion of its own answering, a called station will continue to receive the calling packet 3 in each of the successive frames until all the other stations have completed their answering. Upon the completion of answering from all of the called stations, data is transferred to the called stations. Upon the completion of data transfer, the calling station successively designates the respective called stations in the same manner as described above. Each of the called stations sends out, by the block, information such as the result of signal reception, the status of the terminal, or the like, to the calling station.

As described above in detail, according to the present invention, in an inter-multistation communication network wherein transmitting/receiving operations of digital data are effected in a packet form in a time-division multiplexing mode by using a communication cable, the time slot necessary for answering by the receiving side is estimated and reserved by the transmitting side. Accordingly, there is no possibility that packet interference will occur when an answer packet is transmitted from a called station. Thus, the time required for the connection control may be minimized. This becomes a significant advantage in the case of broadcast communication, resulting in an improvement in the efficiency of use of the whole system, the shortening of the user's waiting time, and the reduction of the busy rate.

What is claimed is:

1. A digital signal transmission system for a multistation communication network of the type wherein digital signals are transmitted over a communication cable between stations in a time division multiplex mode in successive frames with each frame comprising a plurality of blocks, packets of digital signals from each station being arranged in respective blocks, said digital signal transmission system comprising:
   means at a first of said stations for transmitting at least one calling packet onto said communication cable addressed to a second of said stations;
   means at said first station for reserving at least a designated one of said blocks for use by said second station in transmitting at least one answer packet to said first station.

2. A digital signal transmission system according to claim 1, wherein said means at said first station for reserving at least a designated one of said blocks comprises means for inserting into said designated block a signal for ensuring the reservation of said designated block until said second station transmits said answer packet.

3. A digital signal transmission system according to claim 2, wherein said at least one designated block comprises a plurality of successive blocks immediately following the block in which said calling packet is transmitted, said signal for reserving the at least one designated block being inserted into each of said plurality of successive blocks.

4. A digital signal transmission system according to claim 1, wherein said at least one second station comprises a plurality of stations each for receiving the same calling packet, said calling station reserving said at least one designated block for use by each of said second stations when transmitting their respective answer packets and transmitting to said second stations digital signal information informing said second stations of the order in which said second stations are to use said designated block.

5. In a method of digital signal communication of the type comprising the steps of transmitting a calling packet of digital signals from a calling station onto a communication cable in a predetermined one of a plurality of blocks in one frame of repeating time division multiplex frames, receiving said calling packet at a called station and transmitting an answer packet over said cable from said called station to said calling station in a selected block of said one frame or in a succeeding frame, the improvement comprising the steps of:
   reserving at said calling station a designated block in said repeating frames for transmission of said answer packet from said called station to said calling station.

6. A method according to claim 5, wherein said reserving step comprises the step of inserting a signal into said designated block to ensure occupation of said designated block during each of said repeating frames until said called station transmits said answer packet.

7. A method according to claim 5, wherein said at least one designated block comprises a plurality of successive blocks immediately following the block in which said calling packet is transmitted, said calling station inserting a signal into each of said plurality of successive blocks to ensure occupation of said successive blocks until said at least one calling station begins transmission of its answer packet.

8. A method according to claim 5, further comprising the step of transmitting to said at least one called station information as to the location of said at least one designated block.

9. A method according to claim 5, wherein said at least one called station comprises a plurality of called stations and said at least one designated block comprises a plurality of designated blocks, said method further comprising the step of transmitting digital signal information to said plurality of called stations identifying which of said plurality of designated blocks are to be used by respective ones of said plurality of called stations when transmitting their respective answer packets.

10. A method according to claim 5, wherein said at least one called station comprises a plurality of called stations, said method further comprising the step of transmitting to said plurality of called stations digital signal information indicating the order in which said plurality of called stations are to use said designated block in transmitting their respective answer packets.

* * * * *